(12) United States Patent
Hausmann et al.

(10) Patent No.: US 11,530,922 B2
(45) Date of Patent: Dec. 20, 2022

(54) ADVANCED FLIGHT GUIDANCE PANEL WITH DISPLAY OF FUTURE WAYPOINTS AND CONSTRAINTS

(71) Applicant: Gulfstream Aerospace Corporation, Savannah, GA (US)

(72) Inventors: Jeffrey Hausmann, Savannah, GA (US); Kristin Medin, Savannah, GA (US); Scott Bohanan, Savannah, GA (US); Jim Jordan, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/796,464

(22) Filed: Feb. 20, 2020

(65) Prior Publication Data

US 2021/0262803 A1 Aug. 26, 2021

(51) Int. Cl.
*G01C 21/20* (2006.01)
*G06F 3/04847* (2022.01)
*G06F 3/0488* (2022.01)
*G08G 5/00* (2006.01)

(52) U.S. Cl.
CPC ........... *G01C 21/20* (2013.01); *G06F 3/0488* (2013.01); *G06F 3/04847* (2013.01); *G08G 5/003* (2013.01)

(58) Field of Classification Search
CPC ... G01C 21/20; G06F 3/0488; G06F 3/04847; G08G 5/003
See application file for complete search history.

(56) References Cited

U.S. PATENT DOCUMENTS

| 2013/0013133 | A1* | 1/2013 | Walter | G08G 5/0021 701/11 |
| 2014/0032105 | A1 | 1/2014 | Kolbe et al. | |
| 2015/0260525 | A1* | 9/2015 | Parthasarathy | G08G 5/0039 701/538 |
| 2017/0075556 | A1 | 3/2017 | Kulkarni | |

* cited by examiner

*Primary Examiner* — Pei Yong Weng
(74) *Attorney, Agent, or Firm* — LKGlobal | Lorenz & Kopf, LLP

(57) ABSTRACT

Flight control information systems, flight guidance display, and aircraft are provided. A navigational information system includes an input configured to receive a flight plan wherein the flight plan includes a first waypoint, a second waypoint, a third waypoint, and future waypoints, a user interface operative to generate a control signal in response to a user input, a display configured to display a graphical user interface, a processor operative to receive the flight plan from the input, to generate the graphical user interface to include to the first waypoint and the second waypoint and to couple the graphical user interface to the display, the processor being further operative to generate the graphical user interface in to include the first waypoint and the third waypoint in response to the control signal and to couple the graphical user interface to the display.

18 Claims, 5 Drawing Sheets

ADVANCED FLIGHT GUIDANCE PANEL WITH DISPLAY OF FUTURE WAYPOINTS AND CONSTRAINTS

TECHNICAL FIELD

The technical field relates generally to avionics systems for aircraft, and more particularly relates to avionics systems, avionics algorithms, and aircraft with a flight guidance panels operative to display current waypoint and associated constraint information and future waypoint and associated constraint information.

BACKGROUND

In aviation, navigation waypoints are used to indicate points along a desired navigational route where changes in direction, speed, or altitude are required to ensure safe and organized coordination of many aircraft. For example, an aircraft may travel eastbound between a first waypoint and a second waypoint at 33000 feet, or flight level 330 (FL330) and a second aircraft may travel westbound between the second waypoint and the first waypoint at 35000 feet (FL350). Thus, the two planes may pass when traveling between the two waypoints but will be at different altitudes and therefore will pass without incident.

Currently, aircraft Flight Guidance Panels (FGP) only indicate the current settings for speed, lateral, vertical, altitude, and auto-flight. They do not provide information on the next stage of flight. Furthermore, current FGP designs do not incorporate touch capability in the design. All parameters or modes are changed by turning knobs and pressing buttons. For smoke filled cockpit situations, it can be difficult to view the FGP's current seven segment displays to discern the current values of parameters. As such, it is desirable to provide flight systems, flight control algorithms, and aircraft that provide convenient and improved flight guidance and navigation system access and presentation. In addition, other desirable features and characteristics will become apparent from the subsequent summary and detailed description, and the appended claims, taken in conjunction with the accompanying drawings and this background.

The above information disclosed in this background section is only for enhancement of understanding of the background of the invention and therefore it may contain information that does not form the prior art that is already known in this country to a person of ordinary skill in the art.

SUMMARY

Disclosed herein are flight navigational display systems, navigational display algorithms, aircraft and related control logic for provisioning aircraft, methods for making and methods for operating such systems, and other vehicles equipped with onboard control systems. By way of example, and not limitation, there is presented an advanced flight guidance panel with display of future waypoints and constraints. By way of another example, an audible announcement system for announcing changes in navigational constraints such as when approaching waypoints.

In a first non-limiting embodiment, a flight navigational display system may include, but is not limited to an input configured to receive a flight plan, wherein the flight plan includes a first waypoint, a second waypoint, and a third waypoint, a user interface operative to generate a control signal is response to a user input, a display configured to display a graphical user interface, a processor operative to receive the flight plan from the input, to generate the graphical user interface to include to the first waypoint and the second waypoint and to couple the graphical user interface to the display, the processor being further operative to generate the graphical user interface in to include the first waypoint and the third waypoint in response to the control signal and to couple the graphical user interface to the display.

In accordance with another aspect of the present disclosure, a method for receiving, via an input, a flight plan including a first waypoint, a second waypoint and a third waypoint, displaying the first waypoint and the second waypoint on a flight guidance panel, receiving a request for a third waypoint in response to a user input on a user interface, and displaying the first waypoint and the third waypoint on the flight guidance panel in response to the user input.

In accordance with another aspect of the present disclosure, an aircraft including a flight guidance panel for displaying a graphical user interface, a user input for generating a navigational selection, a flight management system for receiving a flight plan wherein the flight plan includes a first waypoint, a second waypoint and a third waypoint, and a processor operative to generate the graphical user interface in response to the first waypoint and the second waypoint, the processor being further operative to generate the graphical user interface in response to the navigational selection, the first waypoint and the third waypoint, the processor being further operative to couple the graphical user interface to the flight guidance panel.

The above advantage and other advantages and features of the present disclosure will be apparent from the following detailed description of the preferred embodiments when taken in connection with the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of avionic display systems, avionic algorithms, and aircraft are provided. In general, the disclosure herein describes a touch sensitive flight guidance panel (FGP) display operative to display current navigational settings and next stage navigational settings to enhance pilot situational awareness and preparedness. In addition, audible cues and warnings may be provided for low visibility situations, such as a smoke-filled cockpit.

Figure 1:
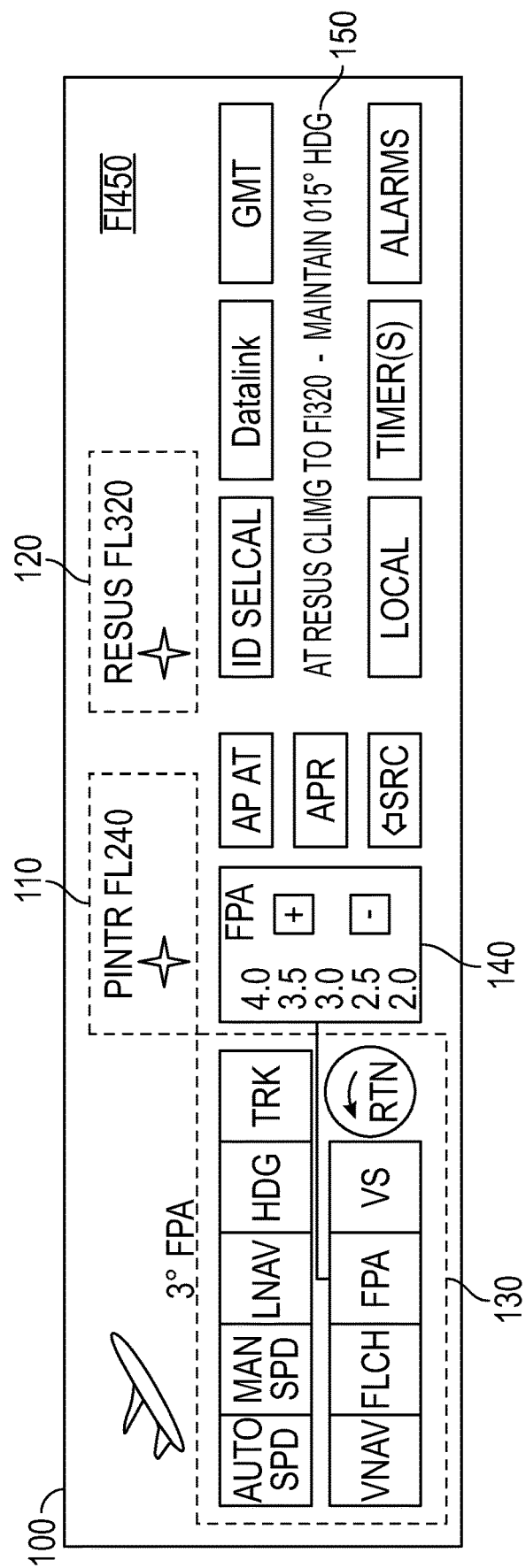
FIG. 1 is illustrative of an exemplary flight guidance panel in accordance with the teachings of the present disclosure.

Turning now to FIG. 1, an exemplary FGP 100 in accordance with an embodiment of the present disclosure is shown. Currently employed flight guidance panels are indicative of current settings for speed, lateral, vertical, altitude, and auto-flight. However, currently deployed flight guidance panels do not indicate or provide information on the next stage of flight. The exemplary FGP 100 concept will be capable of displaying future waypoints with associated constraints such as altitude, heading and speed. The capability to display a series of next waypoints with their associated constraints could be selected. Alternatively, the user may be operative to scroll through the series of next waypoints and their associated constraints. In an exemplary embodiment, the FGP 100 may have a high-resolution, touch sensitive, color display that will be capable of presenting graphics and text to differentiate and enhance the understandability of the information being displayed.

The exemplary FGP 100 may further include a plurality of virtual buttons 130 operative to select between aircraft navigational settings such as auto speed, manual speed, lateral navigation (LNAV), heading (HDG) mode, track (TRK) mode, vertical navigation (VNAV), flight level change (FLCH), flight path angle (FPA) and vertical speed (VS). The exemplary FGP 100 may further include a user input 140 for changing a selected navigational setting. For example, when the flight path angle virtual button is selected, the user may be operative to change the flight path angle using a displayed touch sensitive user input 140 configured to display the flight path angle value and options.

The exemplary FGP 100 is further operative to display the current navigational settings 110 and next stage navigational settings 120. In this exemplary embodiment, the next waypoint displayed in PINTR with a flight level of 240. The exemplary embodiment if further operative to display the next stage navigational setting 120. In this exemplary embodiment, the next stage navigational setting is waypoint RESUS with a flight level of 320. The exemplary FGP 100 may further display a navigational change instruction 150, to illustrate to the pilot a navigational change that must be made at the next stage navigational point. For example, "at RESUS climb to FL320—maintain 015° heading." According to this exemplary embodiment, the exemplary FGP 100 is operative not only to display the current navigational settings 110 and waypoint, but the next stage navigational settings 120 as well as navigational change instructions 150 as to navigational changes that must be made at the next stage navigational waypoint.

Figure 2:
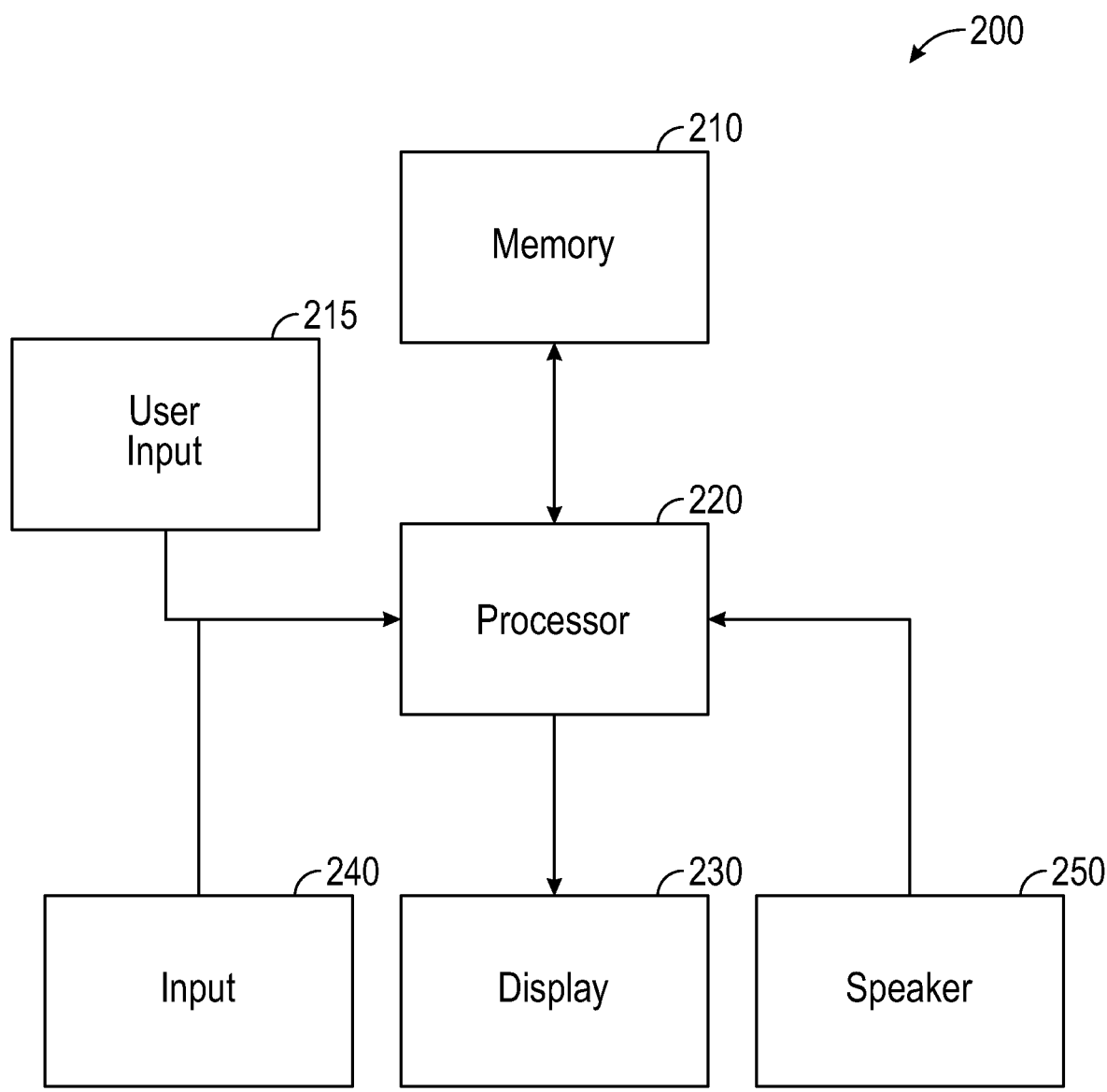
FIG. 2 is a simplified block diagram illustrating a non-limiting embodiment of a system implementing an advanced flight guidance panel with display of future waypoints and constraints in accordance with the present disclosure.

Turning now to FIG. 2, a block diagram illustrative of an exemplary system 200 for implementing the advanced flight guidance panel with display of future waypoints and constraints is shown. The exemplary system 200 includes an input 240, a display 230, a processor 220, a speaker 250 and a memory 210.

In this exemplary embodiment, the input 240 is operative to receive a flight plan from an aircraft user. The flight plan may include information such as departure and arrival points, estimated time en route, alternate airports, pilot and aircraft information, and route information including waypoints, airways, navigational aids etc. The input 240 may be a flight management computer (FMC) a touch screen interface which may be collocated over or under the display 230 to form a touch screen display, or the input 240 may be a data input, such as a network connection, data port, or other data connection for receiving a flight plan, aircraft user instructions, and/or other data from service providers, air traffic controllers or other flight authorities. In one exemplary embodiment, the input 240 includes a wireless network connection for receiving a flight plan from a network server in response to a user generated request received via a user input 215. The user input 215 in this exemplary embodiment may be a button within an aircraft cockpit or may be generated in response to a touch screen menu selection by a user.

In one exemplary embodiment, the input 240 is an FMC operative to receive a flight plan in response to a user input. The flight plan may include an origin, a first waypoint, a second waypoint and a destination as well as associated navigational information, such as flight altitudes. The aircraft user, such as a pilot, is operative to enter each item of the flight plan information into the FMC. The FMC is then operative to couple the flight plan to the memory 210.

The memory 210 may be a physical data storage device, such as a hard drive, solid state drive, hybrid hard drive or other electronic data storage medium. The memory 210 is operative to receive data from the processor 220 and the input 240 via processor 220 and to store this data for future use by the processor 220 in flight algorithms, such as autopilot operations, and for display by the processor 230 or other human machine interface (HMI) such as the speaker 250. In one exemplary embodiment, the memory 210 is operative to store the flight plan received via the input 240 wherein the flight plan includes a plurality of data. The memory 210 is then operative to provide one or more of the plurality of data to the processor 220 in response to a request from the processor 220. For example, the processor 220 may generate a request to the memory 210, requesting a next stage waypoint and associated data. In response the memory 210 may be operative to retrieve the data from a storage medium, format the data in a format appropriate for transmission on an electronic data bus or the like, and to transmit the data to the processor 220.

The display 230 may be mounted in an aircraft cockpit, or accessible to an aircraft pilot, and may be operative to display flight navigational information, such as an FGP. The display 230 may be a liquid crystal display (LCD), light emitting diode (LED), organic light-emitting diode (OLED), or the like. In an exemplary embodiment, the display 230 may be operative to receive navigational information from the processor 220 for display to the pilot. For example, the display may receive the current waypoint, a next stage waypoint, and a following waypoint after the next stage waypoint. The display 230 may then be operative to display the current waypoint and the next waypoint to the pilot. The display 230 may then be further operative to display the following waypoint, either in addition to, or replacing the next waypoint, in response to a pilot input received at the input 215. For example, if the input 215 is a touch sensitive portion of a touch screen display, the pilot may scroll between future waypoints by pushing one of a set of virtual scroll buttons to see future waypoints and associated navigational information in order to gain a better understanding and anticipation of required future aircraft maneuvers.

The processor 220 may be a hardware-based microprocessor, a micro controller, digital signal processor, or the like, and is operative to receive data from the input 240 and the memory 210 and to couple this data to the display 230 for presentation to an aircraft user. The processor 220 may further be operative to generate alarms, informational announcements, or to provide audible alerts related to aircraft navigational information, such as upcoming waypoint announcements, incorrect aircraft settings as compared to navigational flight plan. The processor 220 may for a part of an aircraft navigational computer and may be in communication with other aircraft processors, hardware, aircraft sensors, aircraft controllers and the like.

In an exemplary embodiment, the processor 220 may be operative to receive a first waypoint, a second waypoint, and a third waypoint from the memory 210. The processor 220 may then be operative to couple the first waypoint and the second waypoint to the display 230 for display to an aircraft user. The processor 220 may further couple navigational details for the aircraft to reach the first waypoint, such as flight level and heading, to the display 230 for display to the aircraft user. The processor 220 may then receive a user request generated via the user input 215 indicative of a request to view a subsequent waypoint. The processor 220 may then couple the third waypoint to the display 230 for display to the aircraft user. In one exemplary embodiment, the processor 220 may replace the second waypoint with the first waypoint for display or may generate an alternate graphical user interface including the first waypoint, the second waypoint and the third waypoint. In addition, the processor 220 may couple navigational information for each of the first, second and third waypoints to the display for presentation to the aircraft user.

Figure 3:
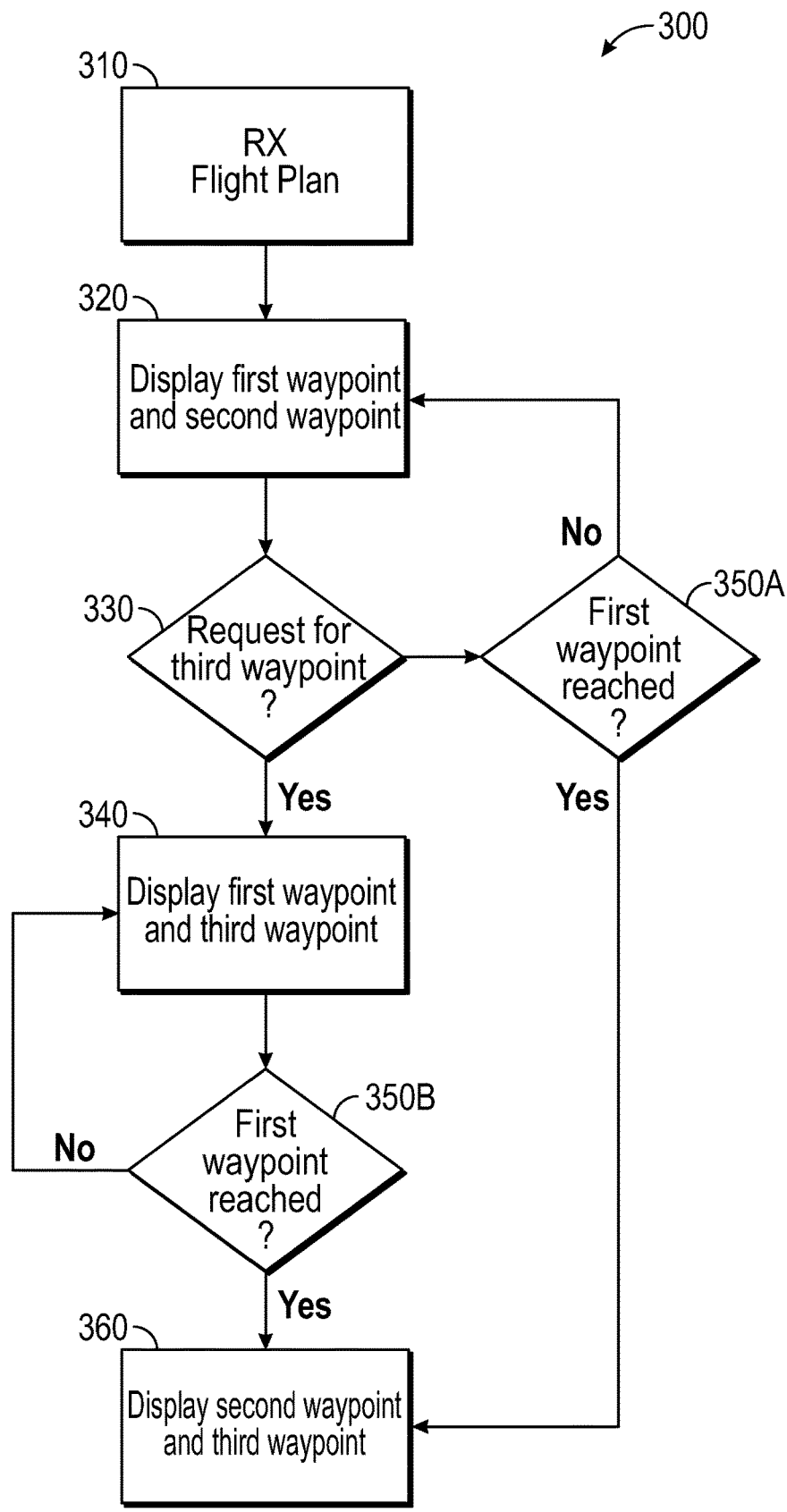
FIG. 3 shows a flow diagram illustrating a non-limiting embodiment of a method for performing the advanced flight guidance panel with display of future waypoints and constraints in accordance with the teachings of the present disclosure.

Turning now to FIG. 3, a flow diagram illustrating a non-limiting embodiment of a method 300 of providing the advanced flight guidance panel with display of future waypoints and constraints in accordance with the teachings of the present disclosure is shown. The method is first operative to receive 310 a flight plan from an input. The flight plan may be received via a wireless network connection, such as a cellular network data connection, a data port, such as a universal serial bus port or the like, or via an FMC. The flight plan may be loaded into the FMC manually by an aircraft user. The flight plan may include an origin airport, a first waypoint, a second waypoint, a third waypoint and a destination. Navigational information, such as flight level and heading may be included in the navigational equipment.

The method is next operative to display 320 the first waypoint and the second waypoint to an aircraft user. In an exemplary embodiment, the first waypoint may be the next waypoint in the flight plan. The first waypoint may be displayed with navigational information such as flight level and heading. The second waypoint may be a subsequent waypoint after the first waypoint in the flight plan. The second waypoint may be displayed with navigational information such as flight level and heading. In an additional embodiment, the method may further display an action or instruction to be performed at the first waypoint during transition to the second waypoint, such as "AT RESUS CLIMB TO FL320—MAINTAIN 015° HDG"

The method is next operative to determine 330 if a request has been received to display the third waypoint. In this exemplary embodiment, the third waypoint may be a subsequent waypoint after the second waypoint in the flight plan. If a request for the third waypoint has been received, the method is then operative to display 340 the first waypoint and the third waypoint. The first waypoint and the third waypoint may be displayed on a display within an aircraft cockpit, such as an FGP. In one exemplary embodiment, the second waypoint is replaced on a graphical user interface by the third waypoint. In an alternate exemplary embodiment, a layout of the graphical user interface may be altered in response to a request for the third waypoint such that the first waypoint, the second waypoint, and the third waypoint are displayed. The request for the third waypoint may be generated by a user input in response to a user action, such as depression of a button, or selection of a virtual button on a touch sensitive display screen.

After the display 340 of the first waypoint and the third waypoint, the method is next operative to determine 350b if a first waypoint has been reached by the aircraft. The determination of reaching the first waypoint may be made in response to data from navigational instruments, aircraft sensors, a flight management computer, or the like. If it is determined 350b that the first waypoint has been reached, the method is operative to display 360 the second waypoint and the third waypoint. In an exemplary embodiment, the first waypoint would be replaced with the second waypoint on the FGP and the second waypoint would be replaced with the third waypoint on the FGP. If it is determined 350b that the first waypoint has not been reached, the method is operative to return to displaying 340 the first waypoint and the second waypoint.

If a request 330 for the third waypoint is not received, the method is operative to determine 350a if the first waypoint has been reached by the aircraft. If the first waypoint has not been reached, the method is operative to return to displaying 320 the first waypoint and the second waypoint. If it is determined 350a that the first waypoint has been reached, the method is operative to display 360 the second waypoint and the third waypoint. In an exemplary embodiment, the first waypoint would be replaced with the second waypoint on the FGP and the second waypoint would be replaced with the third waypoint on the FGP.

Figure 4:
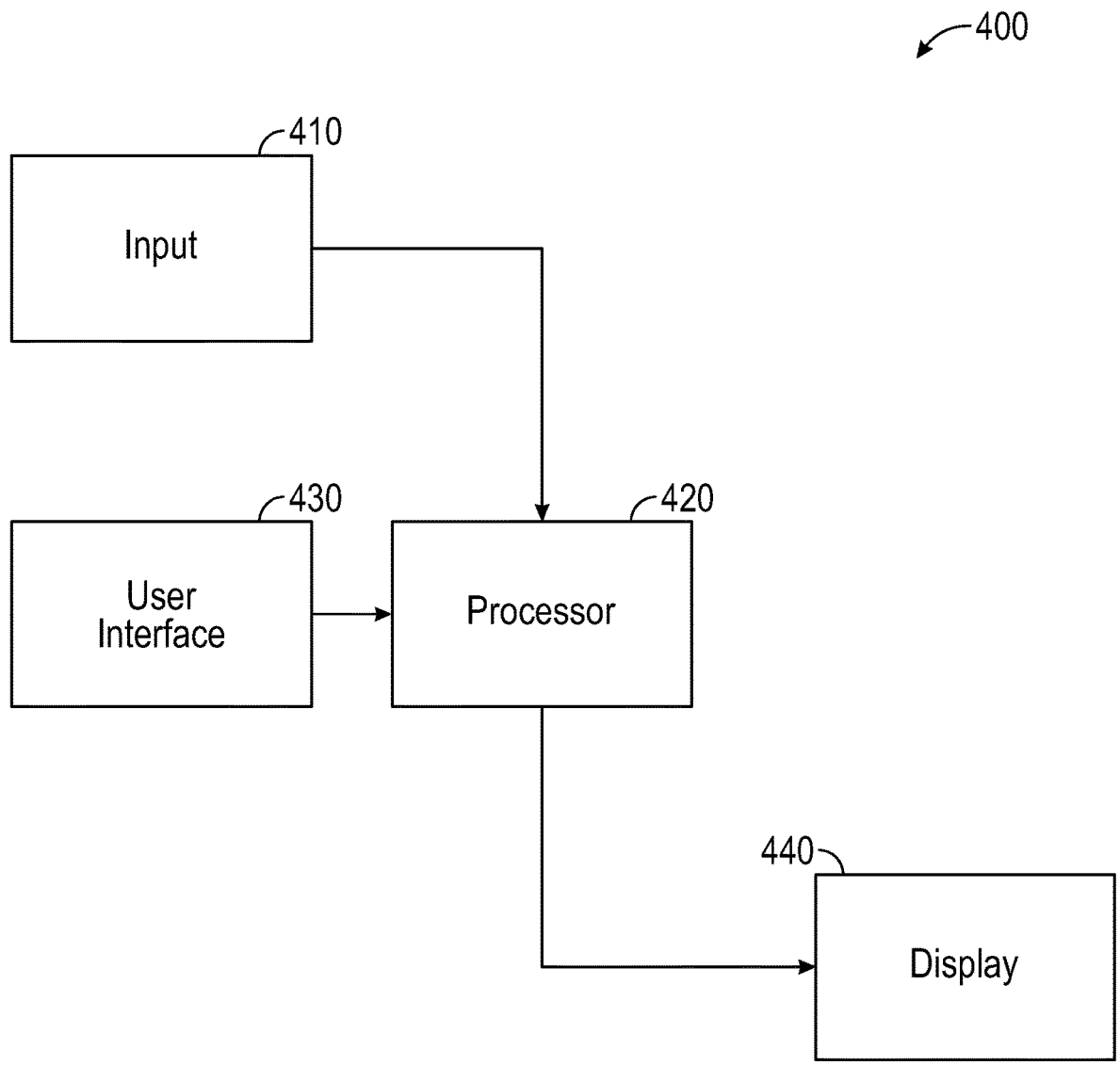
FIG. 4 is a simplified block diagram illustrating another non-limiting embodiment of a system for implementing the advanced flight guidance panel with display of future waypoints and constraints in accordance with the present disclosure.

Turning now to FIG. 4, a block diagram illustrating a system 400 for providing the advanced flight guidance panel with display of future waypoints and constraints is shown. The exemplary system may include an input 410, a user interface 430, a processor 420 and a display 440.

In this exemplary embodiment, the input 410 may be configured to receive a flight plan, wherein the flight plan includes a first waypoint, a second waypoint, and a third waypoint. For example, the input 410 may be a wireless network connection operative to receive the flight plan from a remote computer server. Alternatively, the input 410 may be a flight management system or flight management computer.

In this exemplary embodiment, the user interface 430 may be operative to generate a control signal in response to a user input. The user interface 430 may be a button, dial, or touch screen interface for a touch screen display. The user interface 430 may receive a user navigational guidance selection, such as a request to display later or subsequent navigational waypoints and related navigational constraints such as flight level and heading.

In this exemplary embodiment, the display 440 may be configured to display a graphical user interface. In an exemplary embodiment, the graphical user interface may include include a heading and a flight level related to the first waypoint, the second waypoint and/or the third waypoint. In another exemplary embodiment, the user interface 430 and the display 440 form a touch screen display. In another exemplary embodiment, the display 440 is a flight guidance panel operative to display flight guidance and navigational information.

In this exemplary embodiment, the processor 420 operative to receive the flight plan from the input 410, to generate the graphical user interface to include to the first waypoint and the second waypoint and to couple the graphical user interface to the display 440, the processor being further operative to generate the graphical user interface in to include the first waypoint and the third waypoint in response to the control signal and to couple the graphical user interface to the display 440.

In another exemplary embodiment, the system 400 may include a memory for storing the flight plan and for coupling at least one of the first waypoint, the second waypoint and the third waypoint to the processor in response to a request from the processor. In addition, the exemplary user interface 430 may further include a speaker for providing an audible in response to an aircraft reaching the first waypoint.

In an illustrative exemplary embodiment, the system 400 may include a flight guidance panel 440 for displaying a graphical user interface. The system may include a user interface 410 for generating a navigational selection. The system may further include a processor 420 operative to generate the graphical user interface in response to the first waypoint and the second waypoint, the processor being further operative to generate the graphical user interface in response to the navigational selection, the first waypoint and the third waypoint, the processor being further operative to couple the graphical user interface to the flight guidance panel. In an exemplary embodiment, the second waypoint may be a next stage navigational waypoint to the first waypoint. Furthermore, the graphical user interface may further include a flight control instruction to be performed at a subsequent waypoint. The input 430 may be a flight management system for receiving a flight plan wherein the flight plan includes a first waypoint, a second waypoint and a third waypoint.

Figure 5:
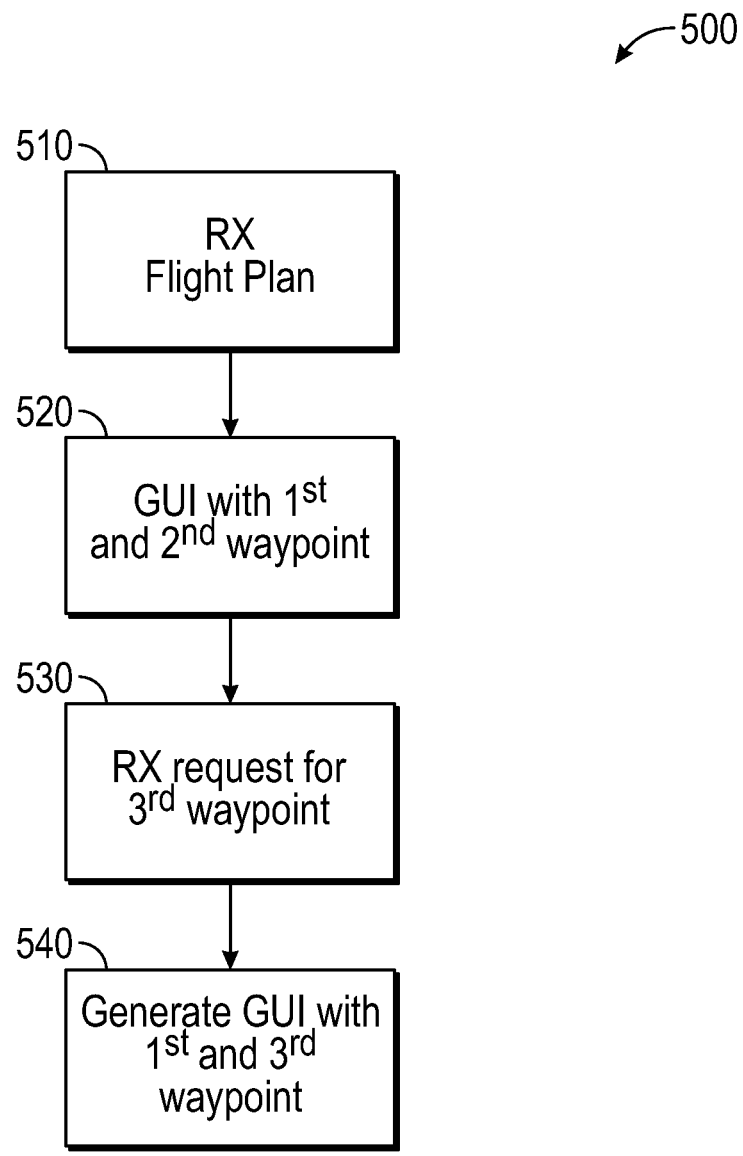
FIG. 5 shows a flow diagram illustrating another non-limiting embodiment of a method for implementing the advanced flight guidance panel with display of future waypoints and constraints in accordance with the teachings of the present disclosure.

Turning now to FIG. 5, a flow diagram illustrating another non-limiting embodiment of a method 500 of providing the advanced flight guidance panel with display of future waypoints and constraints is shown.

The method is first operative for receiving 510, via an input, a flight plan including a first waypoint, a second waypoint and a third waypoint. The method may be further operative for storing the first waypoint, the second waypoint and the third waypoint in a memory in response to receiving the flight plan. In an exemplary embodiment, the input may be a wireless network connection and the flight plan is received via a wireless transmission. Alternatively, the input may be a flight management computer wherein the flight plan is entered manually by an aircraft user and/or pilot.

The method is next operative for displaying 520 the first waypoint and the second waypoint on a flight guidance panel. In an exemplary embodiment, displaying the first waypoint and the second waypoint may include including displaying a heading and a flight level for the first waypoint and the second waypoint. The first waypoint and the second waypoint may be displayed on the flight guidance panel as a graphical user interface generated by a processor.

The method is next operative for receiving 530 a request for a third waypoint in response to a user input on a user interface. In an exemplary embodiment, the user interface and the flight guidance panel form a touch screen display.

The method is next operative for displaying 540 the first waypoint and the third waypoint on the flight guidance panel in response to the user input. In an exemplary embodiment displaying the first waypoint and the third waypoint may include displaying a heading and a flight level for the first waypoint and the third waypoint in response to the user input.

In an additional exemplary embodiment, the method may be operative for detecting a location and generating an audible alert via a speaker in response to the location being indicative of the aircraft arriving at the first waypoint. In addition, the method may be configured for detecting a location, in response to an aircraft sensor, such as a global positioning system, and displaying the second waypoint and the third waypoint in response to the location being indicative of the aircraft arriving at the first waypoint.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus in an aircraft comprising:
    an input configured to receive a flight plan, wherein the flight plan includes a first waypoint, a second waypoint, a third waypoint, a second navigational information associated with the second waypoint and a third navigational information associated with the third waypoint;
    a user interface operative to generate a control signal is response to a user input;
    a display configured to display a graphical user interface wherein the display is a flight guidance panel configured to display a current waypoint and a future waypoint;
    a global positioning system for detecting an aircraft location; and
    a processor operative to receive the flight plan from the input, to generate the graphical user interface to include to the first waypoint, the second waypoint and the second navigational information and not the third waypoint and third navigational information, and to couple the graphical user interface to the display, the processor being further operative to generate the graphical user interface to include the first waypoint, the third waypoint and the third navigational information and not the second waypoint and the second navigational information, received as part of the flight plan in response to the control signal and to couple the graphical user interface to the display wherein the third waypoint and the third navigational information replaces the second waypoint and the second navigational information within the graphical user interface, the processor being further operative for generating the graphical user interface for replacing the first waypoint with the second waypoint and continuing to display the third waypoint and the third navigational information in response to the aircraft location being indicative of the aircraft arriving at the first waypoint.

2. The apparatus of claim 1 wherein the graphical user interface includes a heading and a flight level related to the first waypoint.

3. The apparatus of claim 1 wherein the user interface and the display form a touch screen display and wherein the user interface is a virtual button displayed on the touch screen display and wherein the control signal is generated in response to an activation of the virtual button by a user.

4. The apparatus of claim 1 wherein the graphical user interface forms a flight guidance graphical user interface.

5. The apparatus of claim 1 further including a memory for storing the flight plan and for coupling at least one of the first waypoint, the second waypoint and the third waypoint to the processor in response to a request from the processor.

6. The apparatus of claim 1 further including a speaker for providing an audible in response to the aircraft reaching the first waypoint.

7. The apparatus of claim 1 wherein the input is a wireless network connection operative to receive the flight plan from a remote computer server.

8. A method comprising:
receiving, via an input in an aircraft, a flight plan including a first waypoint, a second waypoint, a third waypoint, a second navigational information associated with the second waypoint and a third navigational information associated with the third waypoint;
displaying the first waypoint and the second waypoint and the second navigational information and not the third waypoint and the third navigational information on a flight guidance panel wherein the flight guidance panel configured to display a current waypoint and a future waypoint;
receiving a request for the third waypoint in response to a user input on a user interface;
displaying the first waypoint, the third waypoint and the third navigational information and not the second waypoint and the second navigational information on the flight guidance panel in response to the user input wherein the third waypoint and the third navigational information replaces the second waypoint and the second navigational information within the display;
detecting an aircraft location; and
replacing the first waypoint with the second waypoint and continuing to display the third waypoint and the third navigational information on the flight guidance panel in response to the aircraft location being indicative of the aircraft arriving at the first waypoint.

9. The method of claim 8 further including storing the first waypoint, the second waypoint and the third waypoint in a memory in response to receiving the flight plan.

10. The method of claim 8 further including displaying a heading and a flight level for the first waypoint and the third waypoint in response to the user input.

11. The method of claim 8 wherein the user interface and the flight guidance panel form a touch screen display.

12. The method of claim 8 wherein the first waypoint and the second waypoint are displayed on the flight guidance panel as a graphical user interface.

13. The method of claim 9 further including generating an audible alert via a speaker in response to the aircraft location being indicative of the aircraft arriving at the first waypoint.

14. The method of claim 9 wherein the input is a wireless network connection and the flight plan is received via a wireless transmission.

15. The method of claim 9 wherein the input is a flight management computer.

16. An aircraft, comprising:
a flight guidance panel for displaying a graphical user interface configured to display a current waypoint and a future waypoint;
a user input for generating a navigational selection;
a global positioning system for detecting an aircraft location;
a flight management system for receiving a flight plan wherein the flight plan includes a first waypoint, a second waypoint, a second navigational information associated with the second waypoint, a third waypoint, and a third navigational information associated with the third waypoint; and
a processor operative to generate the graphical user interface in response to the first waypoint and the second waypoint and not the third waypoint, the processor being further operative to generate the graphical user interface in response to the navigational selection, the first waypoint and the third waypoint and not the second waypoint wherein the third waypoint and the third navigational information replaces the second waypoint and the second navigational information within the graphical user interface, the processor being further operative to couple the graphical user interface to the flight guidance panel, the processor being further operative to generate the graphical user interface for replacing the first waypoint with the second waypoint and continuing to display the third waypoint and the third navigational information in response to the aircraft location being indicative of the aircraft arriving at the first waypoint.

17. The aircraft of claim 16 wherein the second waypoint is a next stage navigational waypoint to the first waypoint.

18. The aircraft of claim 16 wherein the graphical user interface further includes a flight control instruction to be performed at a subsequent waypoint.

* * * * *